United States Patent
Raphael (10) Patent No.: US 8,659,977 B2
(45) Date of Patent: Feb. 25, 2014

(54) ACOUSTIC SIGNAL GENERATION SYSTEM USING MOVING REFLECTING SURFACE

(75) Inventor: David T. Raphael, Valley Village, CA (US)

(73) Assignee: University of Southern California, Los Angeles, CA (US)

(*) Notice: Subject to any disclaimer, the term of this patent is extended or adjusted under 35 U.S.C. 154(b) by 522 days.

(21) Appl. No.: 12/914,816

(22) Filed: Oct. 28, 2010

(65) Prior Publication Data

US 2011/0096629 A1 Apr. 28, 2011

Related U.S. Application Data

(60) Provisional application No. 61/255,801, filed on Oct. 28, 2009.

(51) Int. Cl.
*G10K 11/34* (2006.01)

(52) U.S. Cl.
CPC ..................... *G10K 11/34* (2013.01)
USPC .......................................... 367/138; 367/140

(58) Field of Classification Search
USPC ................................................ 367/138, 140
See application file for complete search history.

(56) References Cited

U.S. PATENT DOCUMENTS

| | | | | |
|---|---|---|---|---|
| 6,285,485 | B1* | 9/2001 | Ferreira | 359/198.1 |
| 6,409,669 | B1* | 6/2002 | Hager et al. | 600/447 |
| 6,783,074 | B1* | 8/2004 | Hammer | 235/462.4 |
| 2007/0040991 | A1* | 2/2007 | Lee | 353/31 |
| 2007/0242329 | A1* | 10/2007 | Ballegaard et al. | 359/201 |
| 2008/0051772 | A1* | 2/2008 | Suckewer et al. | 606/5 |
| 2008/0167555 | A1* | 7/2008 | Qian et al. | 600/439 |
| 2009/0045244 | A1* | 2/2009 | Ou et al. | 228/101 |
| 2009/0160928 | A1* | 6/2009 | Loce et al. | 347/259 |
| 2009/0171271 | A1* | 7/2009 | Webster et al. | 604/95.01 |

* cited by examiner

*Primary Examiner* — Isam Alsomiri
*Assistant Examiner* — James Hulka
(74) *Attorney, Agent, or Firm* — McDermott Will & Emery LLP (57) ABSTRACT

An acoustic signal generation system may include a cylindrical-like object having a cylindrical-like surface which is configured to reflect an acoustic signal directed to a location on the surface in substantially different directions as the cylindrical-like object is rotated. The cylindrical-like surface may be on the exterior of the cylindrical-like object or form an interior surface of the cylindrical-like object. The cylindrical-like surface may be formed by a plurality of substantially flat surfaces connected to one another in a substantially cylindrical configuration. The flat surfaces may have different angular orientations with respect to the axis of rotation. An acoustic transducer may be configured and oriented so as to direct an acoustic signal to a location on the cylindrical-like surface as the cylindrical-like object rotates. A motor may be configured to cause the cylindrical-like object to rotate.

19 Claims, 8 Drawing Sheets

ACOUSTIC SIGNAL GENERATION SYSTEM USING MOVING REFLECTING SURFACE

CROSS-REFERENCE TO RELATED APPLICATION[S]

This application is based upon and claims priority to U.S. provisional patent application 61/255,801, entitled "Forward-Imaging System Based On A Novel Reflecting Surface," filed Oct. 28, 2009. This application is also related to U.S. provisional patent application 61/113,510, entitled "A Forward-Imaging System Based On A Novel Reflecting Surface," filed Nov. 11, 2008. The entire content of each of these provisional applications is incorporated herein by reference.

STATEMENT REGARDING FEDERALLY SPONSORED RESEARCH

This invention was made with Government support under contract no. R41 NS066542-01 awarded by the National Institutes of Health/National Institute of Neurological Disorders and Stroke. The Government has certain rights in the invention.

BACKGROUND

1. Technical Field

This disclosure relates to acoustic imaging systems, including ultrasonic imaging system which generate two and three dimensional images of discontinuities in tissue and other material.

2. Description of Related Art

B-mode acoustic imaging systems may rely upon motion generated by an acoustic transducer. This may be a moving single-element, forward-or-side viewing device, a transducer acting alone or in combination with a reflecting surface (mirror), or a multiple-element array transducer.

Single-element sector probes may be limited by poor near-field imaging because of reverberations between the transducer and the housing. Deceleration-acceleration forces may be caused by a probe's change in direction at the angular extremes of its sector sweep. This may cause dynamic mirror surface deformations that can impair image quality.

Multiple-element linear transducers may need to suppress lobes arising from constructive interference. They may also need complex electrical interconnections because of a large number of elements and channels. Hence, these array transducers can be extremely expensive.

SUMMARY

An acoustic signal generation system may include a cylindrical-like object having a cylindrical-like surface which is configured to reflect an acoustic signal directed to a location on the surface in substantially different directions as the cylindrical-like object is rotated. The cylindrical-like object may have a cylindrical-like surface which can be shaped like a disc, a hollow turret, a torus, or as a longitudinally extended polygon with or without a central hole. An acoustic transducer may be configured and oriented so as to direct an acoustic signal to a location on the cylindrical-like surface as the cylindrical-like object rotates. A motor may be configured to cause the cylindrical-like object to rotate.

The cylindrical-like surface may be on the exterior of the cylindrical-like object or form an interior surface of the cylindrical-like object.

The cylindrical-like surface may be formed by a plurality of substantially flat surfaces connected to one another in a substantially cylindrical configuration. The substantially flat surfaces may change in torsion (twist) angle relative to one another. The cylindrical-like surface may instead change its angle in a continuous fashion.

The motor may be configured to cause the cylindrical-like object to rotate about an axis of rotation. The flat discrete surface or smooth surface may have different torsion (twist) angular orientations with respect to the axis of rotation.

The angular orientations between successive flat surfaces and the axis of rotation may vary in an ascending and/or descending manner. The angular orientations between all of the successive flat surfaces and the axis of rotation may vary in only a single ascending and then only a single descending manner.

The acoustic transducer may be configured and oriented to direct the acoustic signal to the approximate center of each substantially flat surface.

The cylindrical-like reflecting surface may contain a helical twist.

The cylindrical-like object and the acoustic transducer may be configured such that the reflections of the acoustic signal from the acoustic transducer scan a two-dimensional path. The acoustic transducer may be configured to remain stationary while the cylindrical-like object is rotated.

The cylindrical-like object and the acoustic transducer may be configured such that the reflections of the acoustic signal from the acoustic transducer scan a three-dimensional path. An actuator may be configured to cause the acoustic transducer to rotate while the cylindrical-like object is rotated. The actuator may include a gear coupled to the cylindrical-like object. The actuator may include an arm coupling the acoustic transducer to the gear.

The cylindrical-like object and the acoustic transducer may be configured such that the reflections of the acoustic signal from the acoustic transducer scan a three-dimensional path. An actuator may be configured to cause the acoustic transducer to be moved in a to-and-fro manner along the central axis of rotation of the rotating cylindrical-like object, thus making it closer or farther away from the cylindrical-like object, and a separate or the same actuator may be used to rotate the transducer. The actuator may include a gear coupled to the cylindrical-like object. The actuator may include an arm or shaft coupling the acoustic transducer to the gear.

The motor may be configured to rotate the cylindrical-like object at a substantially constant speed.

An acoustic signal generation system may include acoustically-reflecting material having a surface configured to reflect an acoustic signal directed to a target location. An acoustic transducer may be configured and oriented to direct an acoustic signal to a location on the surface as the surface is moved. An actuator may be configured to cause the surface to move relative to the acoustic transducer so as to cause the reflected acoustic signal to scan a three-dimensional path. The actuator may be configured to cause the surface to simultaneously rotate about two orthogonal axes.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings illustrate illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

FIGS. 2A-2C illustrate an example of an alternate embodiment of an acoustic signal generation system which utilizes a rotating cylindrical-like object having a cylindrical-like interior reflecting surface. FIGS. 2A and 2B illustrate an angled-face transducer being rotated about the axis of the cylindrical-like object. It may instead be moved along the axis of the substantially cylindrical object.

FIGS. 7A-7B illustrate an example of portions of a substantially cylindrical endoscope which encloses two structures: an angled-face transducer and a variable-angle reflecting surface. FIG. 7A illustrates their geometric arrangement, and FIG. 7B illustrates dimensions of the two structures, and the distance between their midpoints.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Pre-formed, fixed-shape variable reflecting surfaces (VARS) may be created that contain a desired inherent angular variation, which may be equivalent to that achieved with a scanning mirror or with a multiple-element transducer array. This may result in an acoustic forward-imaging system, which may consist of a single-element ultrasound transducer that needs to interact only with a pre-formed variable-angle reflecting surface. This may enable the creation of two types of commercial acoustic probes: (1) handheld forward-imaging surface probes; and (2) forward-imaging needle endoscopes for use in interventional diagnostic and therapeutic procedures, such as breast and prostate biopsies, regional anesthetic nerve blocks, and other deep tissue surgical procedures.

A continuous three-dimensional curve in space, with perpendicular axes i, j, and k) can be represented by the locus of the end-point of the position vector $r(t)=x(t)i+y(t)j+z(t)k$.

The unit normal $t=dr/ds$ may be the unit tangent vector to the curve. The principal normal n to the curve may be defined by the equation $dt/ds=\kappa n$ where $\kappa$ is the magnitude of $dt/ds$ and $\kappa$ is called the curvature. By defining the binormal b as the vector cross-product $b=t\times n$, it can be shown that the torsion $\tau$ may be the space rate-of-change of the binormal $db/ds=\tau n$. That is, the normal n may be a way to follow the change in the torsion. In the case of a coin, rolling a finger around its smooth edge defines its curvature, and the normal may always be perpendicular to the edge's surface at any point on the coin edge. But if the coin's edge surface becomes progressively angled relative to the flat plane of the coin, a change in the orientation of the normal vector may occur, indicating a progressive change in the torsion (or twist).

A helix may be described with orthogonal axes (i,j,k) by the vector equation:

$$r=a\cos ti + a\sin tj + btk, \text{ the torsion may be } db/ds=\tau n$$

where $\tau=a(a^2+b^2)^{-1}$. Use of 3-D Frenet-Serret formulas may allow for continuous tracking of the torsion angle at any surface point.

A pre-formed variable-angle reflecting surface (VARS) may have all the desired angular variation that would occur upon the sinusoidal sweep of a rotating mirror. Therefore, it may be configured to be the functional equivalent of a classical rotating mirror. It may be sufficient merely to rotate the VARS structure to generate a full angular scan. The annular structure may be powered and rotated at a constant speed by a motor, such as a DC servo motor. A single-element transducer may also be rotated using interlinked gears to the VARS structure.

Ultrasound time-gated pulse-echo backscattering may be used, with emitted beams and target-reflected signals redirected through the VARS.

A single-element focusing transducer may be used and may feature a concave surface, created by the Lockwood press-focusing technique, or a focusing plano-convex lens may be used. The transducer may consist of a thin layer of piezoelectric materials, such as PVDT or PZT-5H or some other material with high acoustic reflectivity, that may be ideal for acoustic matching of the transducer to human tissue, along with one or two matching layers, plus a light backing.

These devices, with simple electronics and a simple inner architecture, may be amenable to miniaturization, micro-injection molding, and commercial mass-production.

The VARS may be made in at least two configurations. They may be distinguished by whether the transducer beam strikes the exterior surface or the interior surface of the VARS structure, and whether the angular changes are discrete or continuous. A discrete example is presented first.

Figure 1:
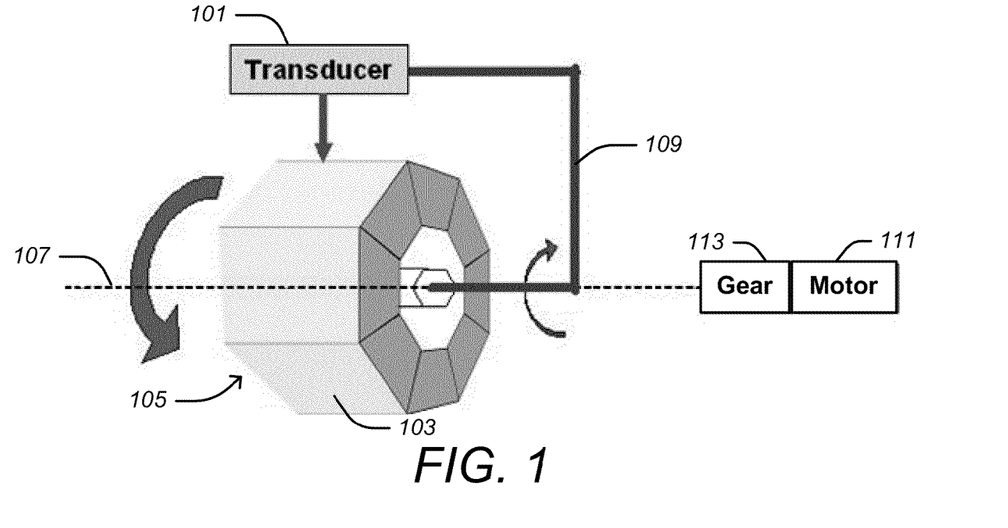
FIG. 1 illustrates an example of an acoustic signal generation system which uses a rotating cylindrical-like object having a cylindrical-like exterior reflecting surface. In this embodiment, an acoustic transducer emits a beam onto one of the surfaces of the rotating cylindrical-like object.

FIG. 1 illustrates an example of an acoustic signal generation system which utilizes a rotating cylindrical-like object 105 having a cylindrical-like exterior surface 103 composed of multiple discrete wedge surfaces. The acoustic transducer 101 may be configured to remain stationary while the cylindrical-like object 105 rotates. As illustrated in FIG. 1, an acoustic transducer 101 may be configured and oriented to emit an acoustic beam which is reflected by a cylindrical-like surface 103 of a cylindrical-like object 105 as it rotates about an axis 107. An arm 109 may connect the acoustic transducer 101 to a gear box 113 which may cause the cylindrical-like object 105 to rotate relative to the fixed position of the acoustic transducer 101. A motor 111 may be is configured to rotate the discrete cylindrical-like object 105 in discrete rotational steps of fixed angular increments, including a brief stop of all motion after each increment, such that the transducer 101 always overlies a temporarily immobile substantially flat reflecting surface.

The cylindrical-like rotating object 105 may have any number of substantially flat reflecting surfaces, such as the eight surfaces that are illustrated in FIG. 1. In this instance, a discrete rotation step of 360/8=45 degrees may cause a new substantially reflecting wedge surface to be positioned in the uppermost position, such as to be directly under the transducer 101. Imaging may occur when the cylindrical-like object 105 is stationary, and may pause when it is moved during a discrete rotation step. Otherwise, blurring may occur if imaging occurs during a discrete rotation step, and the sharp edges between adjacent wedges could produce spurious artifacts. The motor 111 may be configured to cause the cylindrical-like object 105 to rotate about the axis 107 in discrete rotational steps. In an alternative embodiment (discussed below), the acoustic transducer 101 may be rotated while the cylindrical-like object 105 is being discretely rotated. The reflected acoustic beam may travel to a target such as tissue (not shown) and may be reflected back along the same path to the same or approximately the same location on the cylindrical-like surface 103 and back to the acoustic transducer 101.

Imaging may depend on the rotation/counter-rotation of the cylindrical-like surface 103 of the cylindrical-like object 105 relative to the acoustic transducer 101.

The acoustic transducer 101 may be an ultrasonic transducer of any type. For example, the acoustic transducer 101 may be configured to generate a 10 MHz signal with a maximal depth imaging to 6 cm and a 45° angular sector scan.

The cylindrical-like object 105 may be made of any material which reflects acoustic signals, such as tungsten, acrylic, and/or other materials.

Figure 2A:
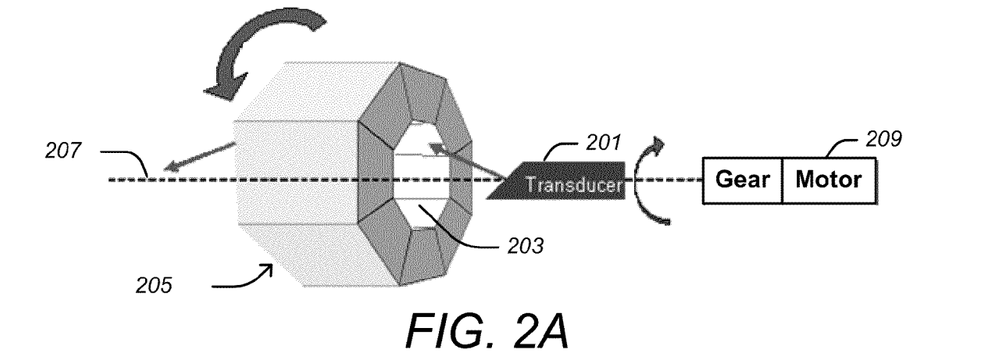
Figure 2B:
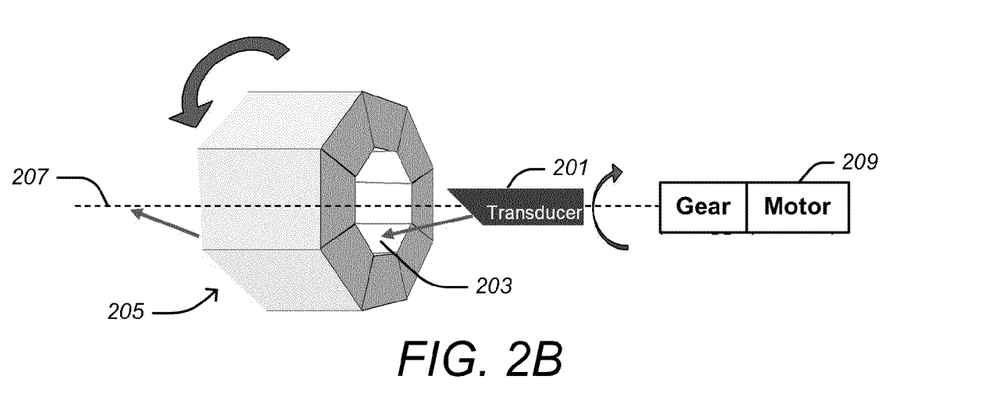
Figure 2C:
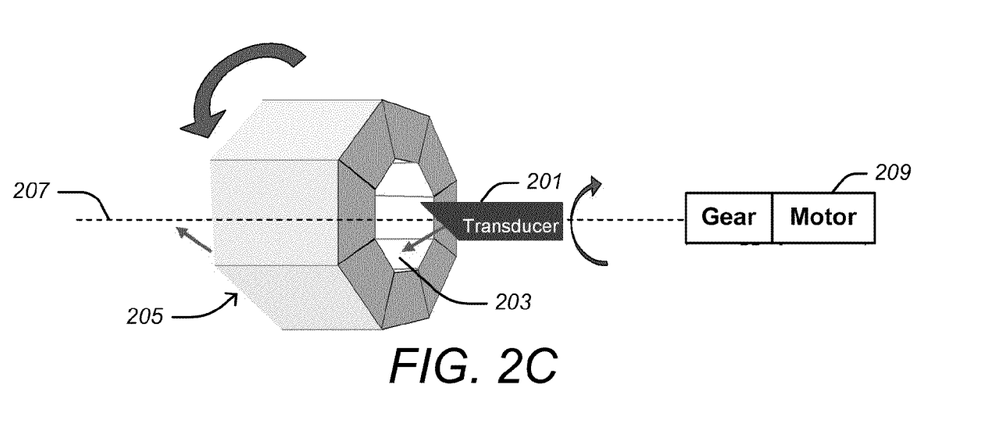

FIGS. 2A-2C illustrate an example of an alternate embodiment of an acoustic signal generation system which utilizes a rotating cylindrical-like object having a cylindrical-like interior surface. This configuration may be the same as illustrated in FIG. 1, except that the beam of an acoustic transducer 201 may be directed towards a cylindrical-like surface 203 on the interior of a cylindrical-like object 205 which may similarly be rotated by a motor 209 about an axis 207. The acoustic transducer 201 may or may not be rotated while the cylindrical-like object 205 is being rotated in any of the ways and using any of the components discussed above in connection with FIG. 1.

As illustrated in FIG. 2A, the acoustic transducer 201 may be an angled-face transducer. The acoustic transducer 201 may be configured and oriented to emit an acoustic beam that strikes the interior cylindrical-like surface 203 through an interior cylindrical-like opening in the cylindrical-like object 205. This beam may be reflected off of that surface and out of the opposite end of the cylindrical-like object 205 as illustrated in FIG. 2A. This reflected beam may then be reflected off of an object (such as tissue) and back along the same path to the acoustic transducer 201.

Rotation of the angled-face transducer, without the use of an interior variable tilt angle reflecting surface, may result in a circular forward-imaging scan which may consist of a succession of cone-shaped beams associated with distal circular arcs of constant radius. One problem with this approach may be overlap of adjacent main lobes. Further, when an angled face transducer with fixed beam angle α relative to the horizontal undergoes a complete rotation, it may create an imaging cone with a central "blind spot." Specifically, for an angled-face transducer with beam angle α, the angular span of the cone's blind spot may be 2α degrees. For an α=45° angle face transducer, the central "blind spot" may be an unacceptably wide central 90° cone.

The variable-angle reflecting surface (VARS) may solve the "blind spot" problem. As illustrated in FIG. 2A, an upwardly angled transducer with fixed beam angle α may produce upwardly directed beams that reflect off the VARS surface that may be tilted at variable angle β, in which case the angle of the reflected beam RB relative to the horizontal may be calculated as RB=90°−α−2β.

Consider an upwardly angled-face transducer with angle α=45°. As shown in FIG. 2A, interaction of the upward beam may be with a VARS surface of variable tilt angle β that varies from 0° to 22.5°. By the above equation, the reflected beam may vary from 0° to 45° below the horizontal. This may provide imaging of the field below the level of the central axis.

If the transducer is rotated by 180°, the angled-face transducer may now be tilted downwards. Interaction of the downward beam may be with a VARS surface with tilt angle β that varies from 0° to 22.5°. Therefore, the reflected beam may vary from 0° to 45° above the horizontal.

The sum of the two imaging fields (one below the level of the central axis, the other above it) may be the image of the central cone that may not have been possible with an angled-faced transducer used by itself.

In principle, the entire 180° field can thus be imaged in the following manner: Use of a rotating VARS surface plus the angle-faced transducer may allow imaging of the central cone of angular span 2α, whereas exclusive use of an angled-face transducer without a VARS surface may be used to generate the field outside the cone.

As illustrated in FIGS. 2B and 2C, the angled-face transducer may be held by a shaft that allows the transducer to be moved along the axis of the cylindrical-like object, either farther away from the cylindrical-like object (FIG. 2B) or closer to it (FIG. 2C). This motion may allow the operator to achieve an altered focusing depth with possible optimization of the image, yet without gross movement of the endoscope. This may require that the VARS surface be extended in length to allow for this capability.

The configurations illustrated in FIGS. 1 and 2A-2C may be used as a surface probe for ultrasound guidance imaging during multiple surgical biopsies, central venous vessel access, evaluation of peripheral vascular disease, and superficial nerve imaging for regional anesthesia. They may also be used to create an ultra-thin acoustic needle endoscope that may be inserted through tissue and advanced toward a target structure.

Rotation and/or counter-rotation of the transducer arm and of the cylindrical-like object may be achieved with separate, synchronized motorized mechanisms.

Exterior Reflecting Surfaces

Figure 3:
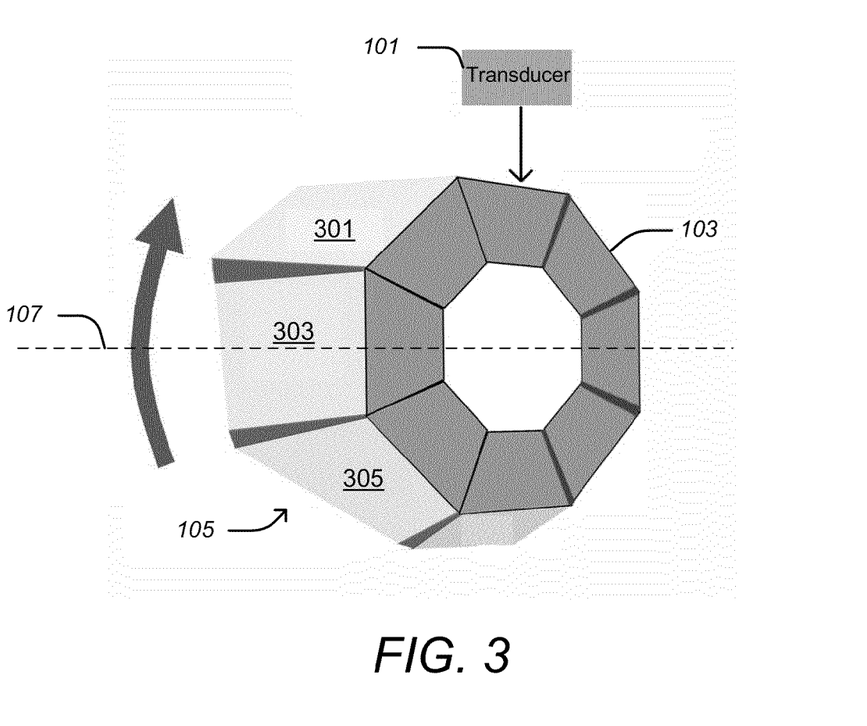
FIG. 3 illustrates a close up of components in the acoustic signal generation system illustrated in FIG. 1.

FIG. 3 illustrates a close up of components in the acoustic signal generation system illustrated in FIG. 1. As illustrated in FIG. 3, the cylindrical-like object 105 may be made of a plurality of wedges, each having a substantially flat surface which may contribute to the cylindrical-like surface 103, such as substantially flat surfaces 301, 303, and 305.

Each substantially flat surface may have a fixed-torsion angle offset relative to the immediately adjacent wedge's reflecting surface. For a fixed-position acoustic transducer, for example, rotation of the cylindrical-like object 105 may cause a successive increase in the tilt (torsion) of successive flat surfaces. The effect may be to cause the beams that all originate at the midpoint of each reflecting surface to reflect at successively different reflection angles. These multiple beams can be used to generate a successive series of focal points in an imaging plane forward of the endoscope.

The beam of the overlying acoustic transducer 101 may always be directed toward the midpoint of each substantially flat surface. As the cylindrical-like object 105 rotates, the substantially-flat surfaces may be sequentially rotated so that each one sequentially comes immediately below the acoustic transducer 101. Thus, substantially flat surfaces 301, 303, 305, and so forth may be successively positioned immediately beneath the acoustic transducer 101.

Figure 4A:
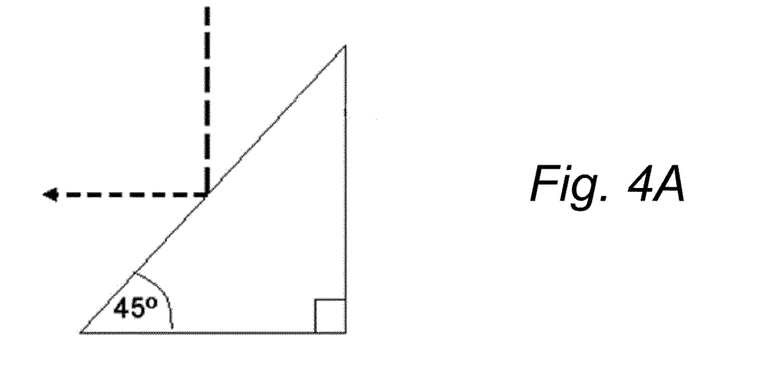
FIGS. 4A-4C illustrate an example of different reflected beam angles that may result from different tilt angles which the substantially flat reflecting surfaces may have with respect to the rotational axis of the substantially-cylindrical object.
Figure 4B:
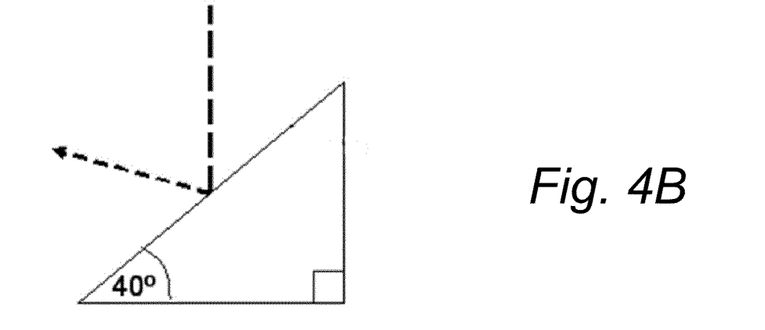
Figure 4C:
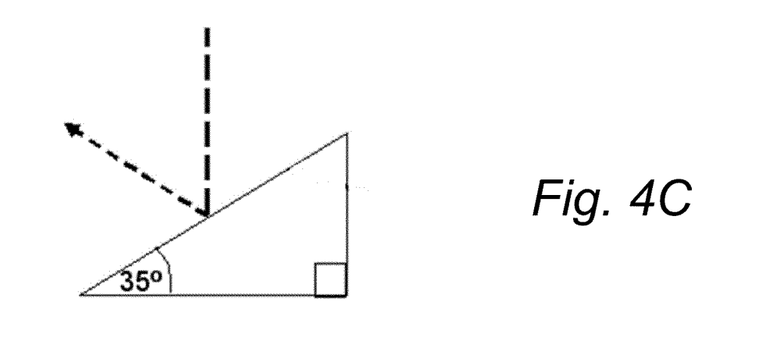

FIGS. 4A-4C illustrate an example of different reflected beam angles that may result from different tilt angles which the substantially flat surfaces 301, 303, and 305 may have with respect to the rotational axis 207 of the cylindrical-like object 105. FIG. 4A illustrates the effect of a 45° tilt angle when, for example, substantially flat surface 301 is beneath the acoustic transducer 101; FIG. 4B illustrates the effect of a 40° tilt angle when, for example, substantially flat surface 303 is beneath the acoustic transducer 101; and FIG. 4C illustrates the effect of a 35° tilt angle when, for example, substantially flat surface 305 is beneath the acoustic transducer 101. In each case, the beam may reflect off a target and return to the acoustic transducer 101 along substantially the same path.

Figures 5A, 5B, 5C:
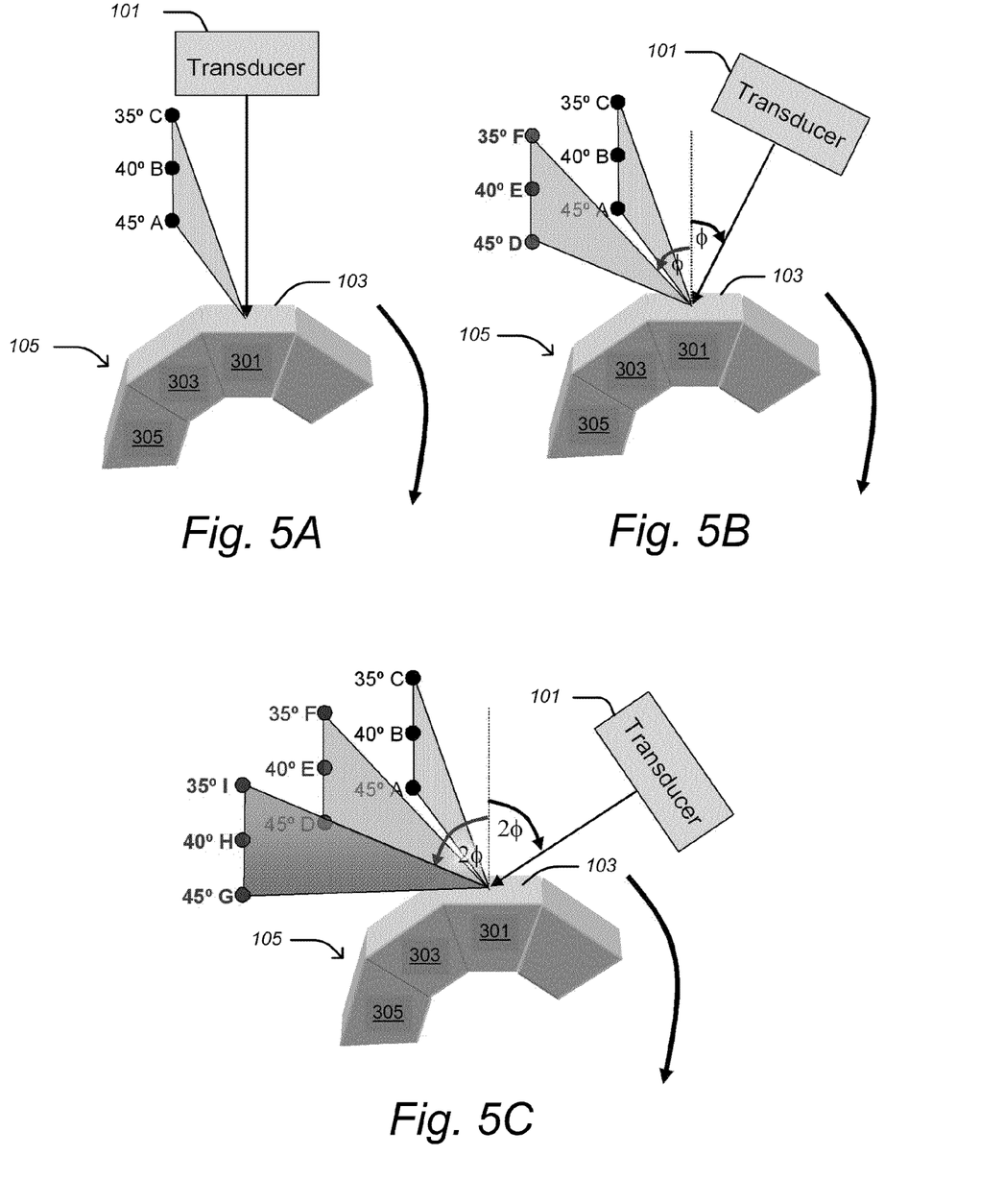
FIGS. 5A-5C illustrate an example of the effect of different tilt angles of the substantially flat exterior reflecting wedge-like surfaces while the acoustic transducer is rotated at different angles from the vertical.

FIGS. 5A-5C illustrate an example of the effect of rotating the cylindrical-like object 105 for different angles of the acoustic transducer 101 relative to a vertical axis passing through the midpoint of the uppermost wedge surface of the substantially cylindrical object 105.

In FIG. 5A, the acoustic transducer 101 is in a vertical position and may emit a beam that strikes an equidistant vertical midpoint of the underlying wedge. Successive discrete rotation of the cylindrical-like object may result in successive positioning of the exterior reflecting surfaces with different tilt angles immediately underneath the transducer.

In FIGS. 5B-5C, the acoustic transducer may emit a beam which is directed at a different angle from the vertical. The incident beam may strike the equidistant midpoint of each successive wedge surface, each with its own distinct tilt angle, as it moves into the most vertical position. Each successive wedge reflecting surface may deflect the incident beam according to its own inherent tilt angle.

In FIG. 5A, the transducer 101 may be at an angle $\Phi=0$ degrees relative to the vertical axis which passes through the uppermost wedge midpoint. The vertical beam of the transducer may interact successively with the substantially flat surfaces 301, 303, and 305 with their different tilt angles as the wedge surfaces are rotated underneath the acoustic transducer 101.

As illustrated in FIG. 5A, the effect of redirecting the beams at these different tilt angles through a single rotation of the cylindrical-like object 105 may be to produce a series of focal points—A, B, C—along a substantially straight line or as a radial arc in an imaging plane directly in front of the rotating cylindrical-like object 105. The result may be a 2-dimensional image.

FIG. 5B illustrates a similar configuration, except that the acoustic transducer 101 is now at a non-zero angle $\Phi$ from the vertical. After a rotation of the cylindrical-like object 105, the result may be the creation of a second series of aligned focal points—D, E, F—along a substantially straight line for small angles, or as a radial arc in a plane at an angle $\Phi$ with respect to the vertical axis. The result may be another 2-dimensional image.

FIG. 5C illustrates the same configuration, except that the acoustic transducer may be at an angle $2\Phi$ from the vertical. After a rotation of the cylindrical-like object 205, this may generate a third set of focal points—G, H, I—along a substantially straight line for small angles, or as a radial arc at an angle $2\Phi$ with respect to the vertical axis. The result may be another 2-D image.

As illustrated in FIG. 5A, if the acoustic transducer 101 is not rotated, the series of points generated by the VARS surface may allow creation of a standard 2-D angular sector, which may be equivalent to that produced by a multi-element array scanner or a synthetic aperture system. If the acoustic transducer 101 is successively moved to any desired specific angle $\Phi$ from the vertical, the result may be a series of multiple 2-D sectors made of multiple focal points along a substantially straight line for small angles, or a series of radial arcs in a plane at an angle $\Phi$ relative to the vertical axis. The multiple 2-D sectors that are generated may facilitate 3-D volume reconstruction, as illustrated in FIGS. 5A-5C.

The 2-D imaging provided by a single-transducer element with a rotating VARS surface may be equivalent to that of a phased array or a synthetic aperture system. Successive 2-D images produced at different beam orientations $\Phi$ relative to the vertical axis may be used to achieve 3-D imaging.

This process may be continued for increments of angle $\Phi$ until a desired scanning sector is covered. In the horizontal plane, substantially flat surface 301 may thus trace out an arc that includes points A, D, and G; substantially flat surface 303 may thus trace out an arc that includes points B, E, and H; and substantially flat surface 305 may thus trace out an arc of points C, F, and I. For N successive $\Phi$ rotations of the acoustic transducer 101, each of which may be followed by a 360° rotation of the cylindrical-like object 305, one may obtain N×M image points, where N may equal the number of acoustic transducer positions, and M may equal the number of substantially flat surfaces on the cylindrical-like surface 103.

If the acoustic transducer 101 is placed above the rotating cylindrical-like object 105, the redirected beam and return signal may be above or below the horizontal surface of the uppermost wedge of the rotating cylindrical-like object 105. The deflected beam may have an angle DB=90−2$\Phi$ degrees. Whenever the substantially flat surfaces which make up the cylindrical-like surface are tilted below 45°, the redirected beams may be above the horizontal, i.e., above the substantially flat surface 301 when it is underneath the acoustic transducer 101. When $\Phi$=O degrees, the result may be a reflected horizontal beam. Whenever the tilts of a substantially flat surface exceed 45°, the redirected beams may be directed below the substantially flat surface 301. As the acoustic transducer 101 drops into a lower plane below the horizontal, the image orientation may be reversed.

The acoustic transducer 101 may be embedded in an outer cylinder which may rotate to cause the acoustic transducer 101 to complete one revolution to create one complete image.

Without a VARS surface, a non-moving, single-element transducer may only allow 1-dimensional imaging. With a rotating VARS surface, a non-moving, single-element transducer may create a 2-D image.

Without a VARS surface, a 2-dimensional circular imaging scan may be created with a single beam transducer attached to a rotating right angle arm. With a VARS surface, and with the use of a rotating right angle arm, it may be possible to create a 3-dimensional scan, as illustrated in FIGS. 1 and 5A-5C.

Figure 6A:
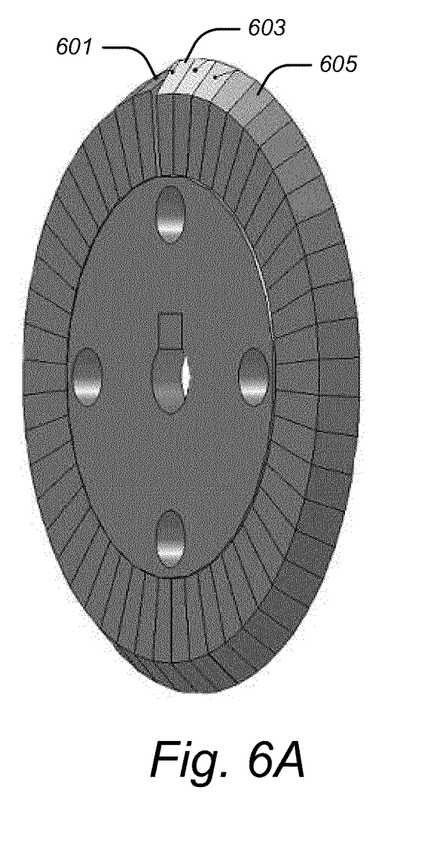
FIGS. 6A and 6B illustrate, respectively, an example of a discrete and a smooth variable-angle reflecting surface on the edge of a cylindrical disc.
Figure 6B:
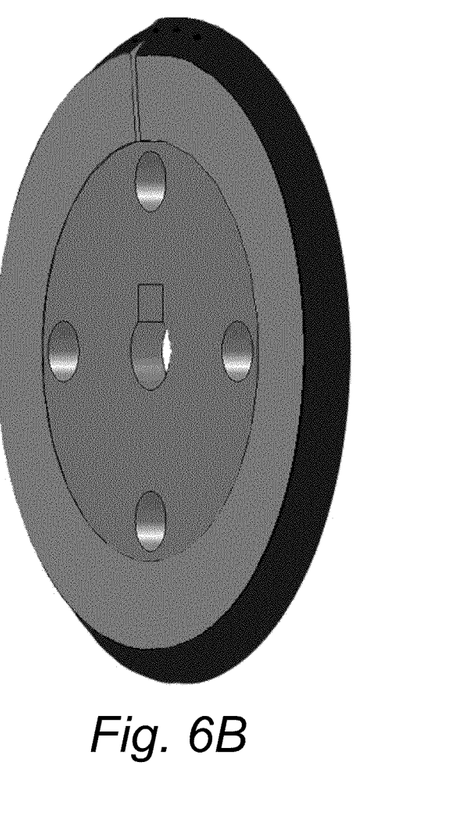

FIGS. 6A and 6B illustrates differences between a discrete VARS external reflecting surface (FIG. 6A) and a smooth continuous VARS external reflecting surface (FIG. 6B) that may be built into the edge of a cylindrical disc. For both FIGS. 6A and 6B, there may be a continuous change in the torsion angle, either in discrete steps (FIG. 6A) or continuously (FIG. 6B). For both discrete and smooth surfaces, the torsion angle may increase continuously counter clockwise along the path of the surface, starting at the top at a wedge 601. After a full rotation of the discrete cylindrical disc, the surface may close in upon itself, such that there may be a torsion angle mismatch between the starting wedge surface 601 and a final wedge surface 603. The same torsion difference may be found with the smooth surface (FIG. 6B). For both discrete and smooth disc surfaces, black dots in the vicinity of 603 indicate VARS surface midpoints. FIG. 6A illustrates an example of what a variable angle externally reflecting structure may look like when composed of successive wedge-shaped surfaces 605 that contiguously fit together. In FIG. 6A, the VARS external surface is made of 50 wedge-like substantially flat surfaces with tilt angles ranging from 35 to 55 degrees. A different number may be used. The distance from the center of the disc to the midpoint of each wedge-like surface may be held constant. The flat surfaces of the successive wedges may exhibit successive fixed-torsion angle offsets (e.g., 0.4)° relative to one another in a plane perpendicular to the plane in which the cylindrical disc rotates. Beginning with a flat surface with a 35° tilt angle, and proceeding clockwise from the top, the torsion tilt angle of each successive flat surface may increase by a fixed torsion increment (e.g., 0.4°), thereby creating an ascending helical-like staircase. As illustrated in FIG. 6A, there may be a cumulative 20° increase in the wedge torsion angle to a maximal torsion angle of 55°. After a complete revolution about the disc, the last wedge may ultimately come to abut the first wedge, such that a side-by-side comparison may show an angular offset of 20 degrees between them, as is evident in both FIGS. 6A and 6B.

FIGS. 6A and 6B are examples of a monotically increasing or ascending helix-like structure. If the rotation direction is reversed (clockwise), a monotonically decreasing helix may result. It is possible to create both an ascending and a descending helix within the same circumference, or vice versa, so that the tilt angle returns to its original position with a net zero change in the cumulative torsion angle.

FIG. 6B shows the smooth surface equivalent of FIG. 6A. The torsion changes are not visibly evident, except at the junction between the start and the finish of the helix.

Interior Reflection Surfaces

Figure 7A:
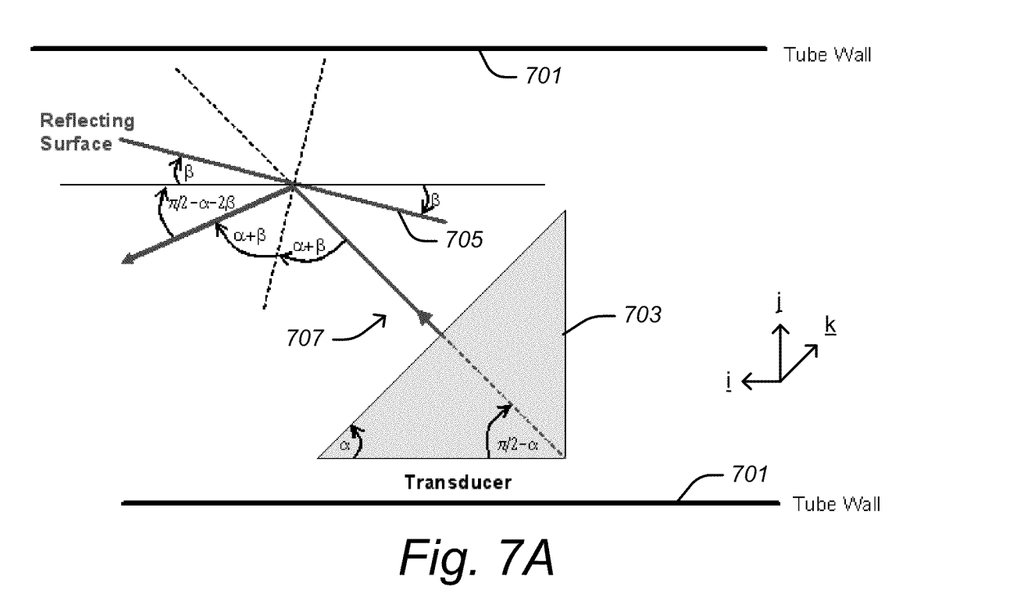
Figure 7B:
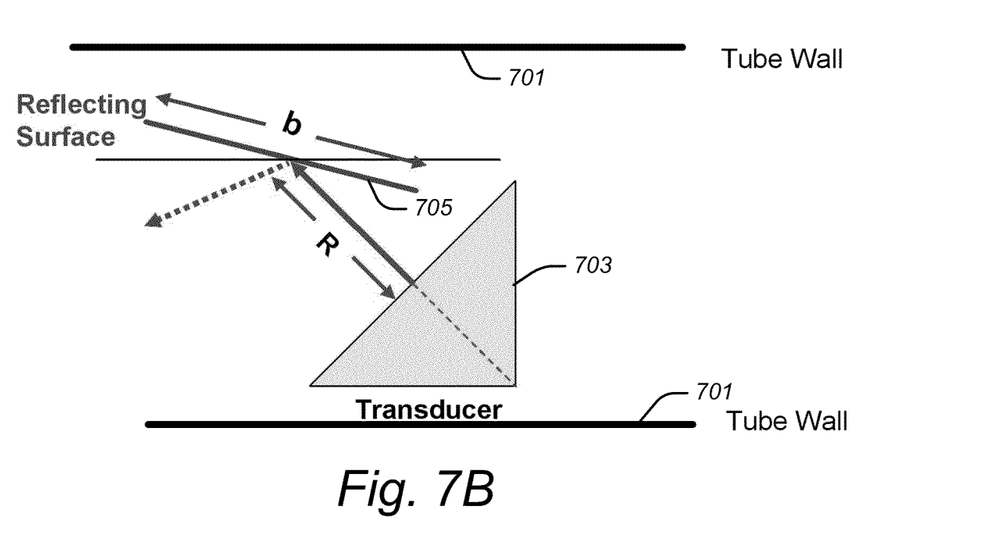

FIGS. 7A-7B illustrates the distal end of a substantially cylindrical endoscope wall 701 which encloses two structures: an angled-face transducer 703 and a variable-angle reflecting surface 705. FIG. 7A illustrates their geometric arrangement, and FIG. 7B illustrates dimensions of the two structures, and the distance between their midpoints.

An emitted beam 707 from an angled-face transducer 703 at fixed-angle α may strike a substantially cylindrical fixed-shape interior surface 705, which may be in the form of a rotating variable-angle reflecting surface with variable tilt angle β. The midpoint of the transducer may be positioned along the central axis, off center, or on the tube wall of the endoscope.

FIG. 7B illustrates a distance R from the midpoint of the angled-face transducer surface to the midpoint of the variable-angle reflecting surface. The reflecting surface is assumed to be of length b.

FIG. 7A illustrates an example of interior surface reflections associated with a signal generation system featuring a rotating cylindrical-like object having a substantially cylindrical interior surface, as within an endoscope. Tube walls 701 may be present. As illustrated in FIG. 7, an acoustic transducer 703 may direct an acoustic signal to a reflecting flat surface 705. All beams may be emitted toward the distal end, i.e., toward the left. All angles may be defined as being positive in a clockwise direction. The face of the acoustic transducer 703 may be cut at an angle α. The emitted beam 707 may emerge relative to the horizontal at positive angle $(\pi/2-\alpha)$ and may strike a plane mirror tilted at angle β. The normal to the mirror plane may equal $(\alpha+\beta)$. The net angle of the reflected transducer beam relative to the VARS reflecting surface may be $(\pi/2-\alpha-\beta)$, and the angle of the reflected beam relative to the horizontal may be $(\pi/2-\alpha-2\beta)$.

By Snell's Law, the total angular deviation between incident and reflected beams may be $2(\alpha+\beta)$. The downward horizontal deviation angle may be HDA=$(\pi/2-\alpha-2\beta)$. Hence, an initially upward beam, as illustrated in FIG. 2A, may be redirected by the VARS surface downwards from the horizontal. When $(\alpha+2\beta)=\pi/2$, a horizontal reflected beam may be produced. After a 180° transducer rotation, as in FIGS. 2B-2C, the incident beam of the angled-face transducer may be oriented downwards, and the result may be a deflected forward beam above the horizontal.

A discretized wedge assembly may be made up of multiple separate wedge-shaped reflecting surfaces attached to the inner surface of an distal endoscope, such that each wedge surface may be tilted by a fixed torsion angle-offset relative to its prior neighbor, thereby producing a cumulative torsion. In general, for the Nth wedge surface with total tilt (N−1)β, the reflected beam from the Nth mirror may emerge with HDA=90°−α−2(N−1)β, for N=1, 2, 3, . . . . The successive tilting of the wedge surfaces, for a fixed angled-tip transducer in zero position, may cause a series of focal points to be generated along a substantially straight line or in a radial arc in a forward imaging plane. When the wedge surfaces have gone through their range, they may be reset at an appropriate position for the next orientation of the angled-face transducer.

FIG. 7B illustrates a beam emitted from the midpoint of the angled-face transducer, traversing a distance R to the midpoint of the VARS reflecting surface of length b, and then being reflected toward a distant object. FIG. 7B illustrates that the VARS surface has an inner boundary and an outer boundary.

An orthogonal set of vector axes i, j, k may have a common origin at the surface midpoint of the transducer 703. Using vector notation, with horizontal axis i (axis positive in the leftward direction) and a vertical axis j (positive in the y direction), the outer boundary (further away from the transducer) may be given by:

$V(\text{outer})=[R \sin \alpha+b/2 \cos \beta]i+[R \cos \alpha+b/2 \sin \beta]j$ whereas the inner boundary is given by $V(\text{inner})=[R \sin \alpha-b/2 \cos \beta]i+[R \cos \alpha-b/2 \sin \beta]j$.

The vector difference between the outer and inner VARS boundaries may be:

$V(\text{outer})-V(\text{inner})=[b \cos \beta]i+[b \sin \beta]j$.

Figure 8A:
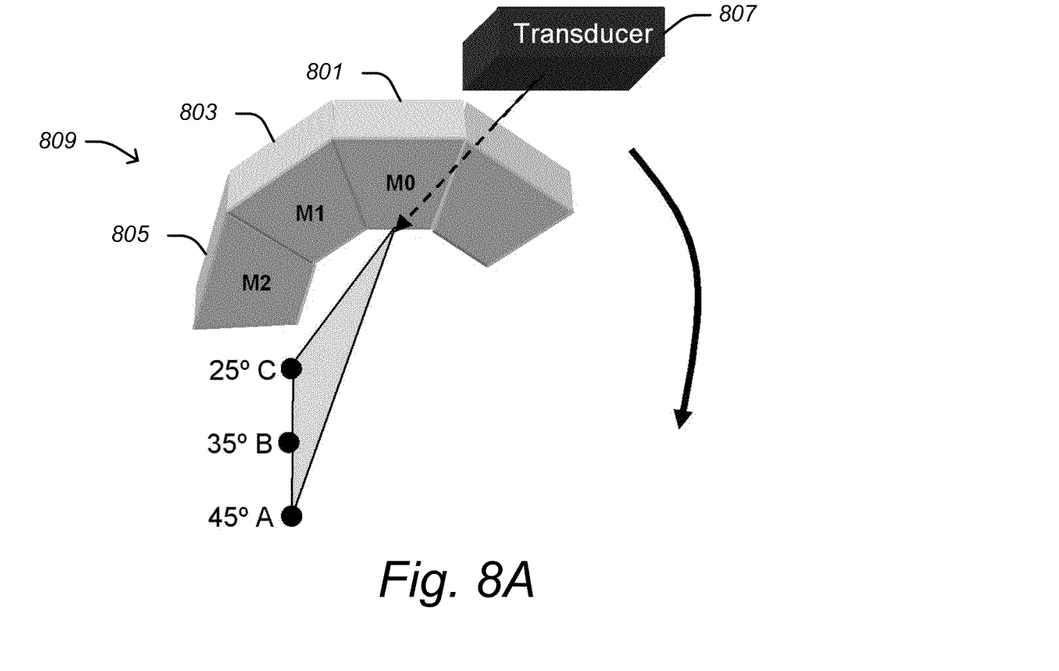
FIGS. 8A-8C illustrate an example of the effect of different tilt angles of substantially flat interior reflecting wedge surfaces while the acoustic angled-face transducer is rotated at different angles.
Figure 8B:
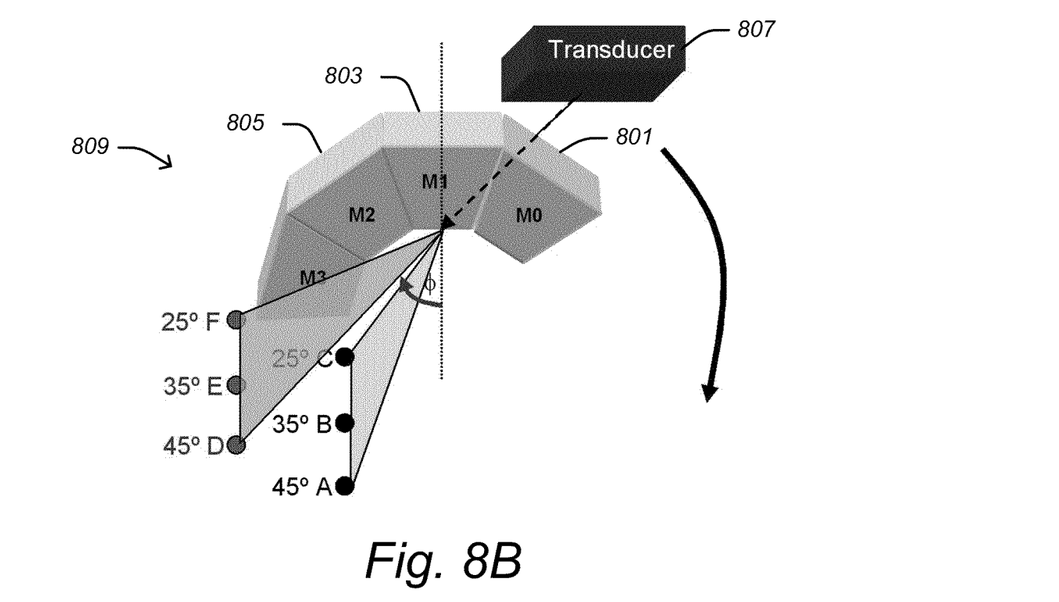
Figure 8C:
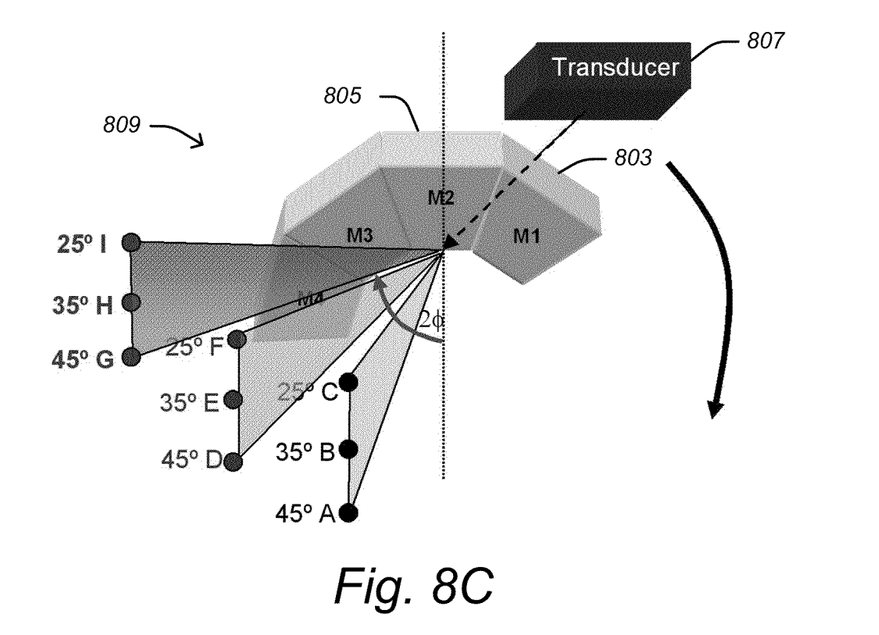

FIGS. 8A-8C illustrate an example of results of rotating the angled-face transducer by angles 0°, Φ, and 2Φ degrees, as it emits a beam that reflects off a variable-angle reflecting surface (VARS) which is interior to a substantially cylindrical object 809. Successive discrete rotations of the cylindrical-like object 809 may result in successive reflections from VARS surfaces of first 801, and then 803, and then 805, as their corresponding wedges are moved into the uppermost position.

An angled-face transducer 807 with emitted beam angle (α=45°) may be internal to a hollow tube (not shown). In this figure, the transducer may be located behind the cylindrical-looking object. For illustration, the angled-face transducer may emit an upwardly directed beam (as in FIG. 2A and FIGS. 7A-7B) that reflects from an equidistant vertical midpoint on the undersurface of each successively rotated wedge. For example, the VARS surface may exhibit different tilt angles β that the substantially flat surfaces 801 (β=0), 803 (β=5°), and 805 (β=10°) may have with respect to the horizontal axis of the cylindrical-like object 809. After reflection from the VARS surface, the reflected beams may be deflected in a downward direction toward a focal point.

In FIG. 8A, for example, with Φ=0°, and successive VARS tilt angles (β=0°, 5°, and 10°), a series of focal points A, B, and C may be associated with beams that have deflection angles of respectively 45°, 35°, and 25° relative to the horizontal. If there was no VARS structure, only the deflected beam containing focal point A might be feasible (1-dimensional imaging). The presence of the VARS surface may allow multiple focal points such as A, B, C, and like points to be imaged in the form of a 2-D angular sector. For small angles, the points A, B, and C may be aligned along a substantially vertical angle. For larger angles, the alignment may be defined by a circular arc with a radius centered at the wedge midpoint reflection site.

FIG. 8B illustrates the effect of rotation of the angled-face transducer 807 by a specific angle Φ, when it is coupled with the rotation of the VARS surface and its presentation of variable β tilt angles (0°, 5°, 10°) to the incident transducer beam. A series of focal points D, E, and F may be associated with the deflected beams at angles, respectively, of 45°, 35°, and 25° relative to the horizontal. Without a VARS structure, only the deflected beam containing point D may be feasible. The presence of the VARS surface may allow multiple focal points such as D, E, F, and like points to be imaged in the form of a 2-D angular sector. For small angles, the points D, E, and F are aligned along a substantially vertical line. For larger angles, the alignment is defined by a circular arc with a radius centered at the wedge surface midpoint reflection site. The 2-D angular sector in FIG. 8B may be rotated about the vertical axis by angle Φ, which may be the same as the angle of rotation Φ of the angled-face transducer about its own axis.

FIG. 8C illustrates the effect of rotation of the angled-face transducer by a specific angle 2Φ, when it is coupled with the rotation of the VARS surface and its presentation of variable β tilt angles (0°, 5°, 10°) to the incident transducer beam. A series of target focal points G, H, and I may be associated with the deflected beams that have angles, respectively, of 45°, 35°, and 25° relative to the horizontal, and that are in the plane of the incident beam. Without a VARS structure, only the deflected beam containing focal point G may be feasible. The presence of the VARS surface may allow multiple focal points such as G, H, I, and like points to be imaged in the form of a 2-D angular sector. For small angles, the points G, H, and I may be aligned along a substantially vertical angle. For larger angles, the alignment may be defined by a circular arc with a radius centered at the wedge surface midpoint reflection site. The 2-D angular sector in FIG. 8C may be rotated about the vertical axis by angle 2Φ, which may be the same as the angle of rotation 2Φ of the angled-face transducer about its own axis.

During a sweep rotation of these generated 2-D angular sectors about the vertical axis with increasing angle Φ, and in the presence of a VARS surface, the lowermost points A, D, and G may be regarded as part of a distinct curved pie-shape sweep, whereas point groups (B, E, H) and (C, I, F) may be associated with separate and differently angled pie-shape sweep planes. The separate sweep planes may be defined by the deflection angle relative to the horizontal, i.e., (π/2−α−2β). Therefore, the integrated use of these successive 2-D sectors, in conjunction with the pie-shaped sweeps that are at different angles from the 2-D sectors, may make 3-D imaging possible. A curved linear array is known to cause a pie-shaped image format.

In summary, without a VARS surface, successive rotation of an angled-face single-element transducer may create a 2-dimensional circular imaging scan with a central defect. Without a reflecting surface to redirect the angled beam, the generated cone-shaped image of an angled-face transducer may exhibit a central "blind spot." Use of a built-in interior reflecting surface, such as a VARS surface, may solve this forward-imaging "blind spot" problem.

With a VARS surface, the successive generation of multiple 2-D angular sectors in the form of radial spokes may be used to create a 3-dimensional curved scan. This may be accomplished with either a discrete or a smooth VARS surface.

If there were no constraints such as bounding tube walls, and if the transducer could be moved upwards or downwards, it might be possible to duplicate the alignment of the points A, B, and C as shown in FIG. 8A, and to create a like 2-D angular sector. But this may not be possible in the very limiting confines of a small tube. Therefore, rotation of the VARS surface may provide a means by which to eliminate the need for any transducer motion, which may itself be undesirable. This argument applies equally well to a synthetic aperture system where successive transducer movements might be likewise necessary. In principle, a VARS surface may be theoretically equivalent to a linear array of single-element transducers.

Figure 9:
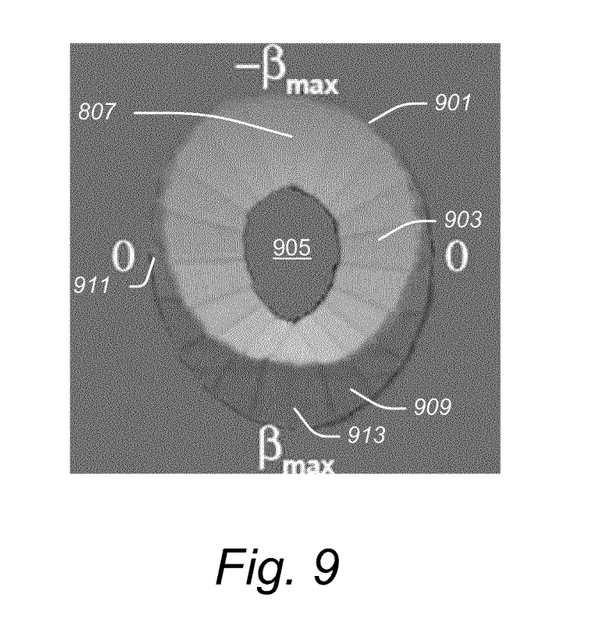
FIG. 9 illustrates an example of what a variable-angle internal reflecting structure may look like that is composed of successive discrete wedge-shaped structures that fit together.

FIG. 9 illustrates a VARS internal reflecting surface that may be used within the interior of a cylindrical hollow tube. FIG. 9 provides a perspective of the transducer as it may look directly down upon the composite VARS structure 901 of successively angled wedges 903. From this perspective, the VARS internal reflecting structure 901 may be composed of successive wedge-shaped structures that fit together to create an annular "football stadium"-like configuration. The central hollow non-reflecting region 905 may be analogous to the playing field within a football stadium. The discrete internal reflecting surfaces 903 may be analogous to the spectator stands of the stadium. The outer surfaces 909 of the individual wedges may be analogous to the surrounding walls of the stadium. At the 50 yard line (911), the stands may be flat, i.e., they may be at a baseline horizontal (0°) torsion angle. At the south goal post 913, the stands may be steeped at a maximum torsion angle $β_{max}$. The total angular range $2β_{max}$ may be covered by N wedges, so that the individual wedge-to-wedge torsion angle offset may be $β_i=(2β_{max})/N$. At the north goal post 915, the stands may be below the level of the horizontal, corresponding to a $-β_{max}$ tilt relative to the 0° horizontal. That is, relative to a 0° horizontal reference level at the 50 yard line, the VARS surface may have a minimal torsion (tilt) angle of $-β_{max}$ degrees and a maximal reflecting torsion angle of $β_{max}$ degrees. The reflecting surfaces of the successive wedges may exhibit a fixed-torsion angle offset relative to one another in the saggital plane, initially in the form of successive increases in torsion angle $β_i$ as the helix ascends from its most negative $(-β_{max})$ position to the steepest position at maximal torsion angle $β_{max}$. In a reverse manner, the helix may begin to descend from the steepest point at $β_{max}$ and descends to a minimum of $(-β_{max})$. In short, the VARS reflecting structure may be a one-half ascending helix and a one-half descending helix. To compensate for the successively altered wedge angles, so that the transducer beam always is aimed at the wedge midpoint, small anti-helical compensation within each wedge's underlying backing may be provided to correct for horizontal and vertical displacements. However, this may be unnecessary if the radius from the exact center of the football field to the midpoint of each wedge inner surface is kept constant. In contrast to the discrete VARS surface illustrated in FIG. 9, a smooth continuous VARS surface may be used without any sharp discrete discontinuities. The smooth helix may exhibit continuous torsion up to a maximal torsion angle βmax and, in reverse manner, descend to a minimum of −βmax. The VARS surface may twist up to a maximal torsion angle $\beta_{max}$ (thereby creating the image in the lower plane), and then undo the twisting on the way back to the starting position (thereby creating the image in the upper plane). For a cylindrical-like surface which is in the interior of the cylindrical-like object, a continuously smooth-surfaced variable-surface structure may likewise be constructed.

In line arrays with conical beams, as the scan angle increases towards 90°, the edges of adjacent cones may begin to overlap, such that the effective beam width may jump to twice its size.

The problem of end-fire geometry may occur when the reflecting surfaces are severely angled. For beam-steering angle ($\theta_O$), as the incident beam is steered towards end-fire ($\theta_O = \pi/2$), the beam width may approach a limiting size called the end-fire bandwidth. To avoid end-fire beam overlap, for both discrete and smooth configurations, the maximal angle $\beta_{max}$ may be limited in either direction to 22.5°, in order to create 45° sector scans.

Applications

Rotating Forward-Imaging Needle Endoscopes

Building a rotating needle forward-imaging VARS acoustic endoscope may include the following components: (1) an ultra-small transducer, which is placed at the tip of a rotating needle, and that focuses the acoustic field in front of a probe. Specifically, a curved concave single element angled-face rotating transducer may produce a beam with minimal divergence at the focal point, with good spatial resolution; (2) a rotary motor-driven gear-linked motion control system, (3) a positioning system that positions the midpoint of the VARS interior surface relative to the midpoint of the transducer, (4) a high-speed image acquisition system, (5) a rotational position encoding system, and (6) a scan conversion system to translate the VARS and non-VARS circular scans into rectilinear imaging scans.

For larger VARS devices, the same considerations may still apply and are discussed below.

Rotating Angled Face Smooth-Surfaced Transducers

Smooth surfaced VARS surfaces may be more practical and more desirable than discrete VARS surfaces. In one embodiment, for a forward-imaging rotating smooth-surfaced VARS needle endoscope, a satisfactory PMT-PZ transducer may have a 2 mm aperture, may emit a 15 MHz ultrasonic beam, and may have a wavelength of 85 microns that could be incorporated into a 3.5 mm diameter needle endoscope. The focal point may be 5 mm ahead of the front of the probe.

Transducers: Discrete VARS Surfaces

For larger discrete VARS devices, the cylindrical-like object may be an N-sided polygon, with wedges approximately 3 mm wide. Each wedge may span an angle of $\theta = (2\pi)/N$ radians, with the radius R originating from the cylindrical-like object center. The surface wedge width may be $s = 2R \sin \theta/2$, and the cylindrical-like object perimeter may be $P = Ns$. If there is a total wedge count of N=50, the cylindrical-like object perimeter may be 150 mm, and thus may have an approximate radius of 24 mm. This may be a reasonable size for a handheld device. The N-sided polygon device may be rotated by a stepper motor at discrete angular increments.

Focused transducers which operate at 10 MHz and Eatlon 30 MHz transducers) may be used for these discrete VARS structures. For a flat cylindrical 10 MHz transducer of 6 mm diameter (a=3 mm), and λ=0.15 mm, the natural focal point may be $Z_f = a^2/\lambda = 6.0$ cm. where its beam width $W_b = (Z_f/a)\lambda =$ is 1.5 mm. As the beam strikes a 3 mm wide cylindrical-like object wedge, the beam width may be narrower than the wedge. Although a flat transducer beam may narrow en route to its focal point, further narrowing of the beam may be required with focused transducers, either with a concave-shaped transducer or with a rubber plano-convex lens that may produce a more proximal focal point. This may be done in order to avoid undesired scattering from the discontinuity between adjacent wedges.

To deal with this problem, a synchronized motion control may be used wherein the motor is configured to rotate a discrete cylindrical-like object in discrete rotational steps of fixed angular increment, including a brief stop of all motion, such that the fixed position transducer upon activation always overlies a temporarily immobile substantially flat reflecting surface. Thinner transducers may be used, but possibly at a cost of decreased SNR. Other, but less likely, modifications to improve SNR may include a tapered transducer-to-wedge duct (with low-pass filtering of resonant peaks), and the use of rectangular-faced transducers for better matching with like-shaped wedges. For a maximal range of torsion angle (−22.5 to 22.5°), the angular separation between adjacent wedges may be (45)/50=0.90°. Image resolution may be improved by interpolating backscatter values between adjacent points.

For a rotating polygonal cylindrical-like object, motion compensation may be achieved with use of synchronization of image reference points to identify specific wedges, a linear phase shifter, and with use of speckle analysis to achieve correction of image smearing due to motion-induced aberrations. For a smooth continuously-tilting VARS cylindrical-like object, similar considerations of synchronized reference points and speckle analysis may apply.

Tracking and Encoding of the VARS Torsion Angle

During rotation of a VARS surface, tracking may be required of the specific VARS surface torsion angle associated with the incident beam, and of the specific torsion angle associated with the specific VARS surface associated with the return beam (VARS torsion angle encoding). This may be accomplished by preserving a fraction of the VARS surface in a non-tilted mode with angular reference points. Combined use of the non-tilted VARS and the tilted VARS surface may allow comparison of the changes in angle orientation between incident and reflected beams during one complete rotation of the entire VARS object. That is, the non-VARS changes may serve as a reference method for self-calibration, and may be used to determine the location of the immediate VARS midpoint reflection site. For a constant sound speed, the calculation of the time-delay between incident and reflected beams may depend on the VARS surface rotation speed, the diameter of the VARS wheel, and the distance between the VARS midpoint and the target. For a continuously moving VARS surface, a continuous mean torsion angle corresponding to the traversed VARS area may be used. For slow rotation rates, this consideration may be insignificant, but this may significant at higher rotation speeds. Tracking of the torsion angles may make use of the Frenet-Serret equations previously described.

Motion Control for the Acoustic Imaging System

1. The Control System

The motion control profiles may be formulated using the interactive motion assist control system tool NI, where the desired configured moves, specified in a point-and-click environment, may generate prewritten blocks of computer code, e.g., LABVIEW Motion Assistant software (Austin, Tex.). This may speed up programming, achieve early system evaluation, and facilitate integration with other I/O non-motion needs. Electronic gearing may be possible, i.e., one can simulate the motion that would occur between two mating gears (a slave axis and a master axis).

2. Motion Controller Environment and Trajectory Calculation

Driver-developed software may be developed that contains functions that communicate with motion controllers, and that assists in configuring and tuning the commanded moves. For different two-axis configurations, the motion controller may use the calculated trajectories for the coordinated multi-axis motion in 2D or 3D space, in order to determine the proper torque command to send to the motor amplifier and to cause motion, with position feedback.

3. Dual Output Axis-Gear-Train Generated Transducer and Annulus Motion

In the configuration of FIG. 1, the transducer-bearing rotating arm may be at right angles to the motor shaft (right angle gear-train motor). Custom low-cost miniature right-angle gears may be used that require either a custom right-angle worm gear or helical gear because these gear types may provide the smoothest, quietest form of two-axis gearing in a minimal space. In the configuration of FIG. 5, the shaft of the gear motor may be aligned with the VARS axis of rotation. B-mode images are acquired during synchronized gear-train driven rotary motion of the VARS surface relative to the transducer.

4. B-Mode Imaging

To form an image, the digitized radio frequency (RF) signal may be processed to extract the envelope and to logarithmically compress it into the dynamic range of the display. A median filter may be employed to further remove noise. The raw RF data may be stored in a hard drive of a PC for further processing. Imaging parameters such as time-gain compensation, pulse repetition frequency, etc. can be easily changed. Data acquisition may utilize a high-frequency, high frame rate ultrasound B-mode imaging system with minimal signal processing error for real-time display.

5. Acoustic Imaging System Performance Measures

Ultrasound Time-Gated Pulse Echo Backscattering:

Time gating may allow the acquisition of backscattered echoes from the region of interest. The backscattered echoes may be normalized to the echo from a flat reflector to minimize the effect of the system on the data. Because of the small apertures used, optimal impedance matching may be required in order to maximize the transducer sensitivity.

Machining of the VARS Surfaces

A micromachining technique that may be used is EDM, or electrical discharge machining. EDM may make use of a series of rapidly recurring current discharges between two electrodes separated by a dielectric. One of the two electrodes may be the 'tool electrode' whereas the other may be the 'workpiece electrode'. When the two electrodes are separated by a short distance, the electric field intensity may exceed the dielectric strength, thus allowing inter-electrode current flow. Under these breakdown voltage conditions, material can be removed from the electrodes. EDM may be able to achieve the cutting of desired contours or cavities in metals, with polishing down to the 0.5 micron level. Nanoscale cutting can be achieved with micro-EDM techniques.

Parametric equations programmed into a CAD-CAM system can be used to guide the EDM cutting of an arbitrarily shaped surface, such as a VARS surface. Alternatively, cutting can proceed initially with the cutting of discrete variable-angle reflecting surfaces (either exterior or interior) that can be smoothed with blended surface and spline techniques so as to create a continuous smooth VARS surface.

Ultra precision micromachining of the VARS structures may also be done with the use of a Nanotechnology 350 FG conformal deterministic diamond-turning, milling, and grinding machine. This diamond-turning machine may be capable of creating both axisymmetric and non-axisymmetric optical components, with a combination of surfaces (aspheric, conical, cylindrical, diffractive, plano, or pointed). In essence, this numerically-controlled, multi-axis, ultra precision machining system may be capable of generating arbitrary conformal surface shapes with a programmed resolution of 10 nanometers, all achieved within a 250 mm×250 mm×300-mm machining envelope. Diamond turnable materials may include aluminum, copper, their alloys, and many polymers. In addition, optical glasses, ceramics, and ferrous materials can be precision ground.

To generate a VARS helical surface on a cylindrical-like object, the parametric equations for the ascending-descending helix may first be specified. With advanced control and feedback systems, the equations may drive the single crystal diamond tool to create the desired VARS surface without any need for post-machining polishing. Preferential removal may be accomplished through zone dwell time. That is, the longer any area of the lens is polished with the workpiece spindle, the more material is removed. If needed, a surface finish can be added so as to effect a surface variation as low as 1-2 nm.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, a single substantially flat reflection surface may be manipulated by an actuator so as to cause the surface to rotate about two orthogonal axes. An acoustic transducer may be configured and oriented to direct an acoustic signal to a location on this surface. The movement imparted by the actuator may be configured to cause the reflected acoustic signals to scan a three-dimensional path.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

None of the claims are intended to embrace non-statutory subject matter, such as an abstract idea, law of nature or natural phenomena; obvious subject matter; nor subject matter lacking novelty, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

The invention claimed is:

1. An acoustic signal generation system comprising:
    a cylindrical-like object having a cylindrical-like interior surface which is configured to reflect an acoustic signal directed to a location on the surface in substantially different directions as the cylindrical-like object is rotated;
    an acoustic transducer configured and oriented so as to direct an acoustic signal through one side of the cylindrical-like interior surface to a location on the cylindrical-like surface as the cylindrical-like object rotates, resulting in reflections of the acoustic signal traveling out of an opposing side of the cylindrical-like interior surface and being directed in different directions as the cylindrical-like object is rotated; and
    a motor configured to cause the cylindrical-like object to rotate.

2. The acoustic signal generation system of claim 1 wherein the cylindrical-like surface is on the exterior of the cylindrical-like object.

3. The acoustic signal generation system of claim 1 wherein the cylindrical-like surface is formed by a plurality of substantially flat surfaces connected to one another in a substantially cylindrical configuration.

4. The acoustic signal generation system of claim 3 wherein:
    the motor is configured to cause the cylindrical-like object to rotate about an axis of rotation; and
    the flat surfaces have different offsets from parallel to the axis of rotation.

5. The acoustic signal generation system of claim 4 wherein the offsets between successive flat surfaces and the axis of rotation vary in an ascending and/or descending manner.

6. The acoustic signal generation system of claim 4 wherein the offsets between all of the successive flat surfaces and the axis of rotation vary in only a single ascending and then only a single descending manner.

7. The acoustic signal generation system of claim 3 wherein the acoustic transducer is configured and oriented to direct the acoustic signal to the approximate center of each substantially flat surface.

8. The acoustic signal generation system of claim 3 wherein the motor is configured to rotate the cylindrical-like surface in discrete rotational steps of fixed angular increment and to pause after each discrete rotational step.

9. The acoustic signal generation system of claim 1 wherein the cylindrical-like object and the acoustic transducer are configured such that the reflections of the acoustic signal from the acoustic transducer scan a two-dimensional path.

10. The acoustic signal generation system of claim 9 wherein the acoustic transducer is configured to remain stationary while the cylindrical-like object is rotated.

11. The acoustic signal generation system of claim 1 wherein the cylindrical-like object and the acoustic transducer are configured such that the reflections of the acoustic signal from the acoustic transducer are non-planar and scan a three-dimensional path.

12. The acoustic signal generation system of claim 11 further comprising an actuator configured to cause the acoustic transducer to rotate while the cylindrical-like object is rotated.

13. The acoustic signal generation system of claim 11 wherein the acoustic transducer is an angled-face acoustic transducer and further comprising an actuator configured to cause the angled-face acoustic transducer to rotate by an angular increment, with each such increment causing a partial or total rotation of the cylindrical-like object, followed successively by more increments and corresponding rotations of the cylindrical-like object, until a scan is complete.

14. The acoustic signal generation system of claim 11 further comprising an actuator configured to cause the acoustic transducer to slide axially in parallel to the rotational axis of the cylindrical-like object while the cylindrical-like object is rotated.

15. The acoustic signal generation system of claim 12 wherein the actuator includes a gear coupled to the cylindrical-like object.

16. The acoustic signal generation system of claim 15 wherein the actuator includes an arm coupling the acoustic transducer to the gear.

17. The acoustic signal generation system of claim 15 wherein the cylindrical-like surface is smooth and continuous and wherein the motor is configured to rotate the surface object at a substantially constant speed.

18. The acoustic signal generation system of claim 17 wherein the actuator is configured to cause the surface to simultaneously rotate about two orthogonal axes.

19. An acoustic signal generation system comprising:
    acoustically-reflecting material having a surface configured to reflect an acoustic signal directed to a location on the surface;
    an acoustic transducer configured and oriented to direct an acoustic signal to a location on the surface as the surface is moved; and
    an actuator configured to cause the surface to move relative to the acoustic transducer so as to cause the reflected acoustic signal to be non-planar and to scan a three-dimensional path.

* * * * *